United States Patent [19]
Kongsgaard et al.

[11] Patent Number: 5,855,188
[45] Date of Patent: Jan. 5, 1999

[54] FLOORING FOR A FARROWING PEN

[75] Inventors: Bjarne Kongsgaard, Ikast; Knud Haargaard, Vodskov, both of Denmark

[73] Assignee: Ikadan System A/S, Ikast, Denmark

[21] Appl. No.: 676,109

[22] PCT Filed: Jan. 11, 1995

[86] PCT No.: PCT/DK95/00019
§ 371 Date: Dec. 2, 1996
§ 102(e) Date: Dec. 2, 1996

[87] PCT Pub. No.: WO95/18525
PCT Pub. Date: Jul. 13, 1995

[30] Foreign Application Priority Data

Jan. 11, 1994 [DK] Denmark .................................. 0050/94

[51] Int. Cl.⁶ .................................................. A01K 1/00
[52] U.S. Cl. .................................................. 119/509
[58] Field of Search .................................. 119/509, 526, 119/528, 529, 530

[56] References Cited

U.S. PATENT DOCUMENTS 4,628,662  12/1986  Nooyen ................................. 119/530 X

FOREIGN PATENT DOCUMENTS

| 472206 | 2/1992 | European Pat. Off. . |
| 2463578 | 2/1981 | France . |
| 3203323 A1 | 8/1983 | Germany ................................. 119/509 |
| 3244732 | 6/1984 | Germany . |
| 220492 A1 | 4/1985 | Germany ................................. 119/509 |
| 1212388 | 2/1986 | U.S.S.R. . |

*Primary Examiner*—Gene Mancene
*Assistant Examiner*—Yvonne Abbott
*Attorney, Agent, or Firm*—Watson Cole Stevens Davis, P.L.L.C.

[57] ABSTRACT

A flooring in a pigpen includes first and second grates which provide two levels to the flooring, the upper level intended for the sows and the lower level for the piglets. The second grates, which provide the upper flooring level, can be positioned on the first grates or on a steel subfloor support grid. The flooring can include third and fourth grates which enable the second grates forming the upper flooring level to extend obliquely to a side of the pigpen.

13 Claims, 7 Drawing Sheets

FLOORING FOR A FARROWING PEN

BACKGROUND OF THE INVENTION

The present invention relates to a flooring in a pigpen which includes at least one first, substantially rectangular grate that is provided with supporting means for support on a first set of supporting steel along at least two of the sides of the grate, and which first grate is positioned in a first area of the pigpen and with the walking surface of the grate in a first level in the pigpen, and at least one second, substantially rectangular grate which is positioned in a second area of the pigpen and has the walking surface of the grate in a second, higher level in the pigpens and a grate for use in such flooring.

When constructing farrowing pens in stables for pigs it is necessary that various conditions be taken into consideration. It has to be possible to construct the pen for existing needs, just as it has to be possible to change the construction of the pen as needs change. Additionally, there has to be the possibility of providing pens which fulfill the existing needs independent of the dimensions of the pen, i.e., the length and the width of the pen.

For farrowing pens in stables for pigs, in some countries it is important that the sow is at a higher level than normal floor level. Thereby, the risk of piglets being caught under the sow is reduced substantially when the sow lies down or turns over. This means that in a limited part of the farrowing pen it is necessary to provide a second, higher level for the walking surface in the pigpen in relation to the walking surface in the remaining parts of the pigpen.

Floorings are known where a separate grate is positioned above an already made standard grate, which separate grate in its own way is fastened to the standard grates and which thus provides a higher level for the walking surface in the part of the pen which is covered by the separate grate. However, there are several drawbacks when creating a higher level according to this principle. Firstly, the separate grates are not adjusted to the individual pen, wherefore these seldom fulfill the existing needs in a satisfactory way. Secondly, the hygienic conditions are reduced substantially by positioning a separate grate above the already made standard grates, as waste and other impurities are gathered in the spacing between the underside of the separate grate and the top side of the standard grates. Thirdly, it is difficult to fasten the separate grate to the standard grates, as it is necessary to use means which do not generate permanent changes in the grates in consideration of later use of the pen, also, it is important that the fastening means do not break the uniform, level surface of the walking surface.

Thus, it is the object of the present invention to provide grates for constructing a flooring and such flooring of the above-mentioned type, and which is constructed by grates which constitute modules which may co-operate mutually in order to fulfill the necessary needs, and which may be changed depending on changing needs.

SUMMARY OF THE INVENTION

This object is obtained with a flooring which is characterized in that the second grate is provided with supporting means for support on supporting steel and that the second grate has side edges, which extend to the first level in the pigpen and form an unbroken connection with the first grate in the first level.

In a preferred embodiment the flooring is characterized in that the flooring also includes at least one third, substantially trapezoidal grate which is provided with supporting means for support on the first set of supporting steel along at least one of the sides of the grate, and which third grate is positioned in the first area of the pigpen and with the walking surface of the grate in the first level in the pigpen, that the flooring also includes at least one fourth, substantially trapezoidal grate which is provided with supporting means for support on a second set of supporting steel, which is directed obliquely in relation to the first set of supporting steel, that the fourth grate is positioned in the second area of the pigpen and with the walking surface of the grate in the second, higher level in the pigpen, and that the second grate is intended for co-operating with the fourth grate and for being supported by the second set of supporting steel.

As mentioned, the present invention also relates to a grate, which is characterized in that the grate is a second grate and is provided with supporting means for support on supporting steel.

With grates of the above-mentioned type it is possible to construct a flooring in a pigpen with due care to individual needs and dimensions of the pigpen. The pen is divided into two areas a first area having a first level of the walking surface in the pen, and a second area having a second higher level of the walking surface. The pen may be constructed with the second higher level of the walking surface directed parallel to the sides of the pen to be constructed, or with the second higher level directed obliquely in relation to the sides of the pen. The area of the pen which constitutes the higher level may be shorter or longer, just as the higher area of the pen may be smaller or wider.

The individual grates co-operate in such a way that smooth transitions are formed between the individual grates and between the first and second area of the pen. The grates which constitute the higher level of the pen are provided with flanges which generate the smooth transition between the first and second area of the pen. These flanges constitute the only superimposing between these two areas of the pen, and thus there is no superimposing between the underside of the grates in the second area and the top side of the grates in the first area. This ensures that waste and other impurities are not gathered at the transition between the first and the second areas of the pen.

The higher level of the pen, which is the area of the pen where the sow is, will preferably be made from cast iron. The other areas of the pen may be made up of many different types of grates, however preferably plastic grates. Additionally, in this area of the pen heating plates and other flooring elements than grates may be provided.

The interconnection of the grates in the first and the second area of the pen, respectively, is carried out by suitable connection means. According to a preferred embodiment the interconnection of the grates in the first area of the pen is carried out by means of a per se known toothing which is provided on two of the four sides of the grate with trapezoidal teeth and tooth spacing, which engage each other. According to a preferred embodiment, the connection means of the grates in the second area of the pen are constituted by substantially drop-shaped projections and recesses, respectively, which also are provided along two of the four sides of the grates.

In the preferred embodiment where the pen is arranged with the second area directed obliquely in relation to the sides of the pen, the supporting steel will be made up of two sets.

A first set, which supports the grates in the first area of the pen, and a second set, which supports the grates in the second area of the pen. The second set of supporting steel is directed obliquely in relation to the first set and in the same direction, which the raised part of the pen is directed obliquely in relation to the remaining part of the pen. The angle between the first and the second set of supporting steel is of between 45° and 90°, preferably 76°. In a preferred embodiment the second set of supporting steel is constituted by an upper and lower profile, which are interconnected by means of transverse profiles so that the supporting steel constitute a lattice construction. In this way it is possible to reduce the masse per unit of length of the supporting steel and thereby increase the span of this. This is especially advantageous in cases, where the supporting steel has to span a manure canal.

The second grate according to the invention is intended for being supported by the second set of supporting steel as described above.

DESCRIPTION OF THE DRAWINGS

The invention will now be further explained with reference to the accompanying drawing, wherein.

DETAILED DESCRIPTION OF THE PREFERRED EMBODIMENTS

Figure 1:
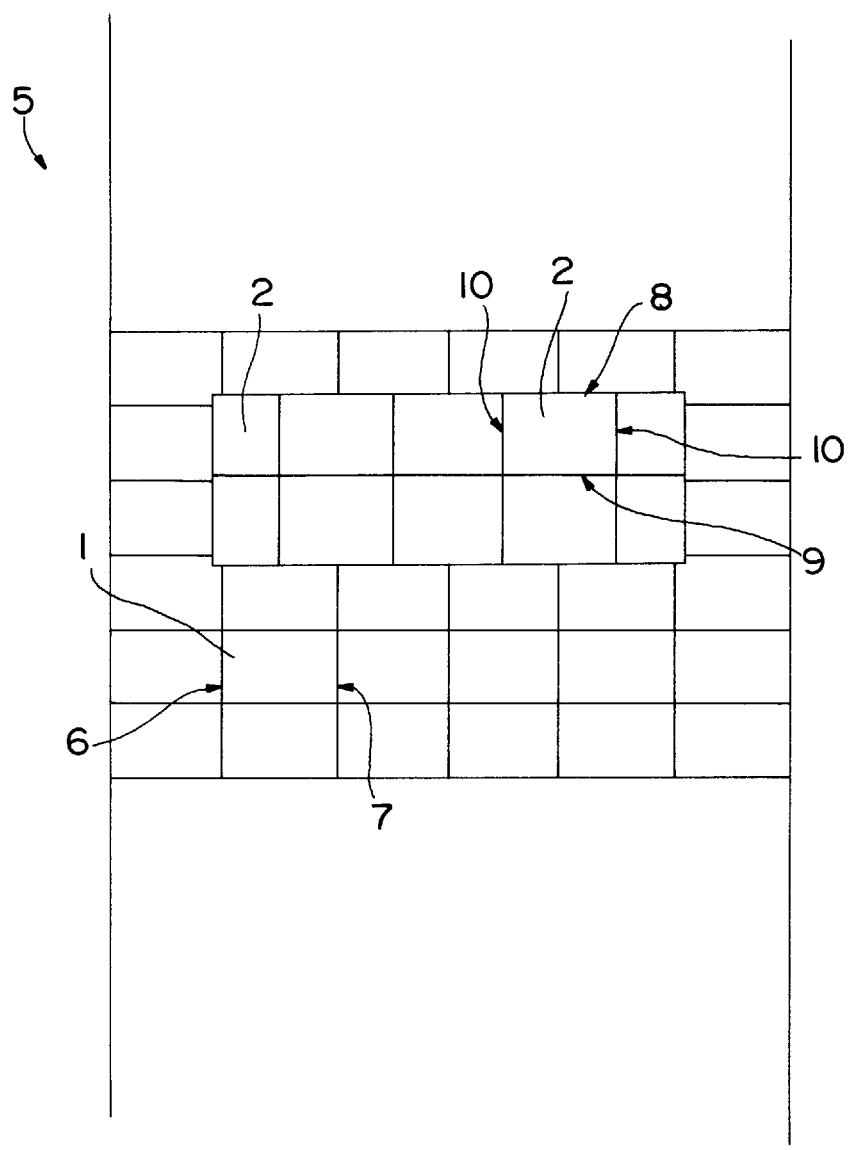
FIG. 1 shows a first embodiment for a pigpen with flooring according to the invention.

FIG. 1 illustrates a flooring for a pigpen, especially a farrowing pen according to a first embodiment of the invention. The pen 5, in principle two different types of grates 1,2. A first per se known grate in a first area of the pen, which constitutes a first level of the walking surface in the pigpen. The grate 1 may have many different forms, just as wall-to-wall plates may be used instead of the grate, e.g., heating plates, or other flooring elements for use in a pigpen.

The first grate 1 is in a known way supported by a first set of supporting steel (see FIG. 3), which is made up of flat iron extending parallel to two sides 6,7 of the grate 1. The support takes place by means of per se known inverted U-shaped teeth (see FIG. 4), which are provided along at least the two sides 6,7 of the grate 1, and where the supporting steel is intended for being positioned between the branches of the U.

Figure 3:
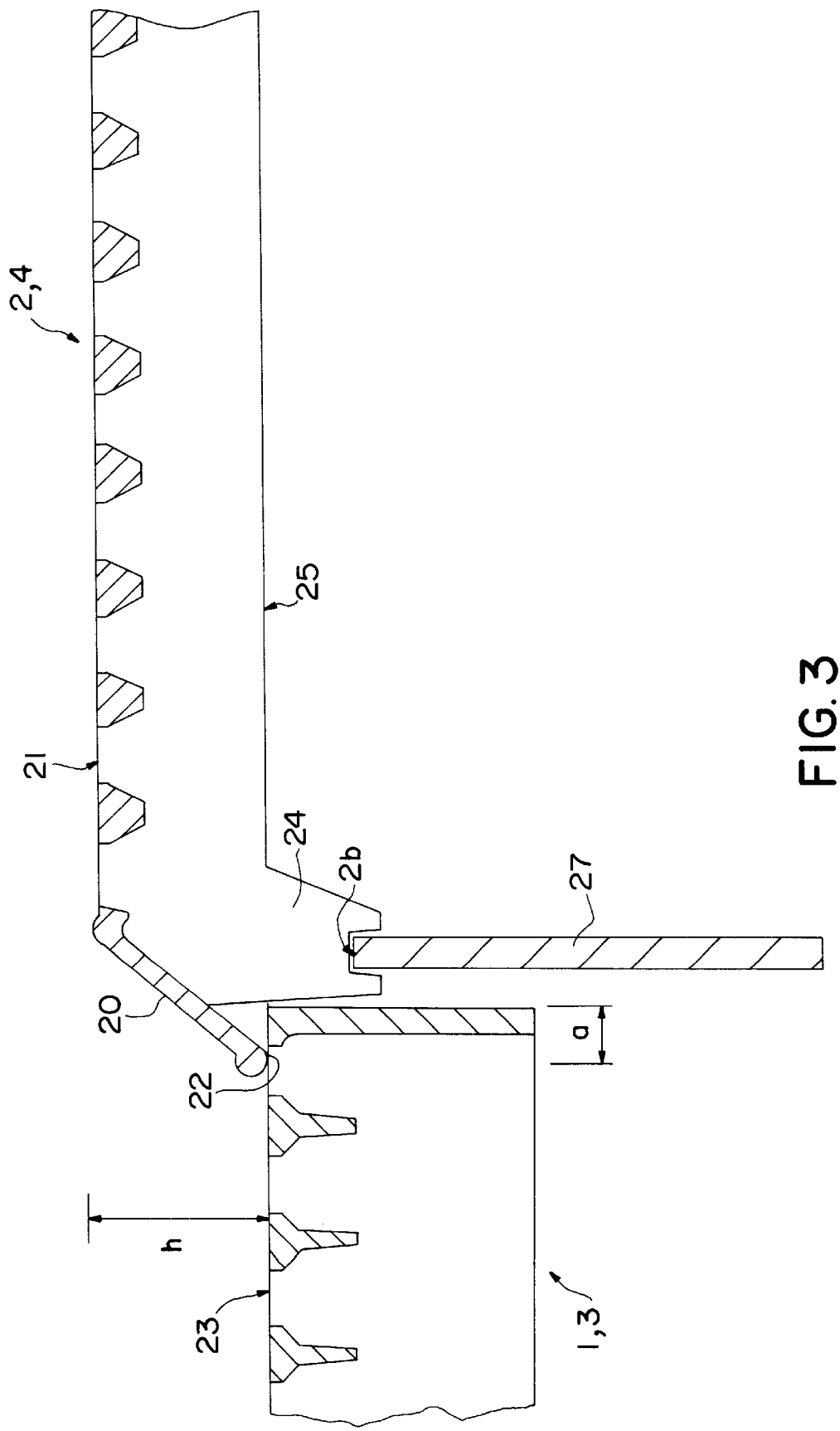
FIG. 3 shows a section through a transition between one embodiment for a first and a second, higher level of the flooring.

In the embodiment shown the second grate 2 is also supported by the first set of supporting steel 27 (see FIG. 3). The support takes place by means of a foot 24 (see FIG. 3), which is provided in a suitable amount along the side edges 8,9 of the grate 2 on the underside 25 of the grate. The foot 24 rests on the upper edge 26 of the supporting steel 27 just as the U-shaped tooth on the first grate 1. The foot 24 is positioned in such a way that it is arranged in a tooth spacing on a first adjacent grate 1, when the grates 1,2 are positioned on the supporting steel in the pen.

Figure 2:
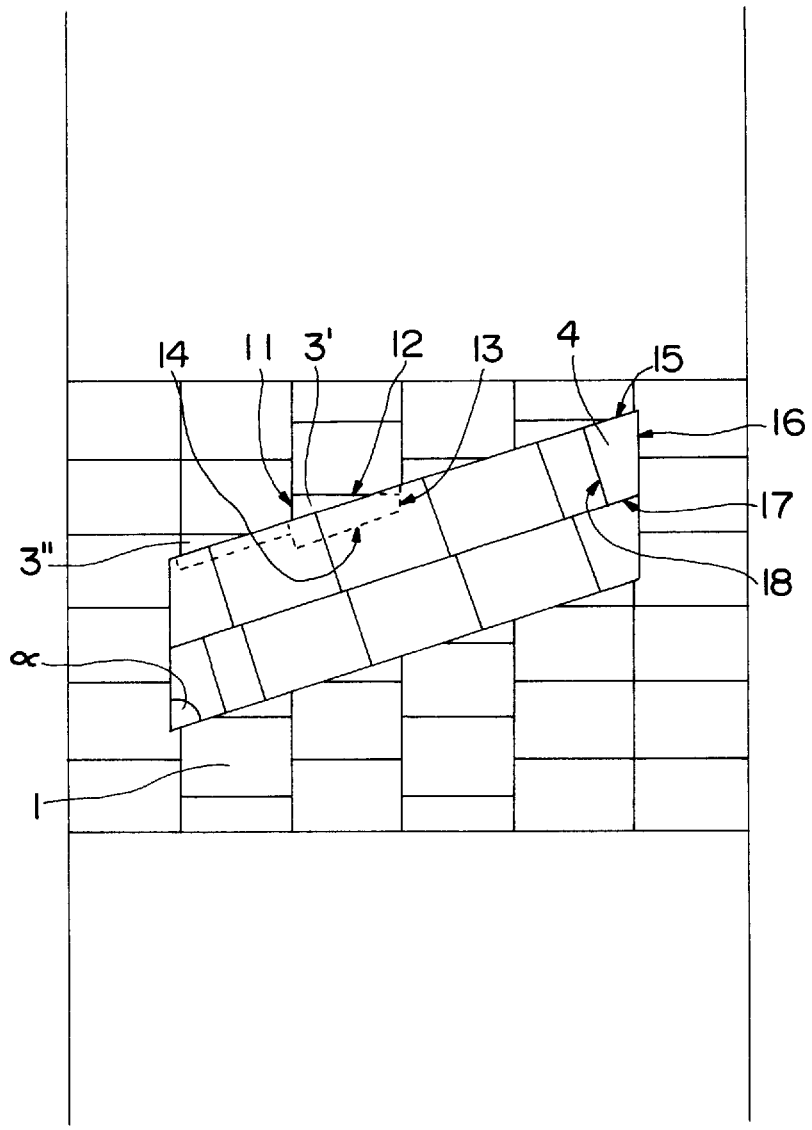
FIG. 2 shows a second embodiment for a pigpen with flooring according to the invention.

FIG. 2 illustrates a second embodiment for constructing a flooring for a farrowing pen according to the present invention. In this embodiment the pen comprises in principle four different grates 1,2,3,4, as the second higher level is directed obliquely in relation to the sides of the pen. This results in additional grates 3,4 having to be used in the transition between the first and the second level. The first and the second grate 1,2 correspond to the corresponding first and second grate illustrated in FIG. 1. Additionally, a third and fourth grate 3,4 are provided which form the transition between the first level and the second higher level, when the higher level is directed obliquely, as shown.

The third grate 3 is a trapezoidal or trilateral grate, respectively 3' and 3", which is positioned in the first level. The grate 3 is supported by the first set of supporting steel 27 (see FIG. 3). The first set of supporting steel extends parallel to the side 11 of the grate. If the grate 3 is trapezoidal, the circumference is delimited by the three sides 11,12,13 of the grate, which abut the first type grate 1, and by the fourth side 14 of the grate, which is positioned in the transition between the first level and the second higher level.

The fourth grate 4 is also a trapezoidal grate, which however is positioned in the second higher level. The grate 4 is supported by a second set of supporting steel 32 (see FIG. 8), which extends at an angle α in relation to the first set of supporting steel 27; an angle, which corresponds, to the oblique orientation of the second higher level. The trapezoidal shape is delimited by the three sides 15,16,17 of the grate, which is positioned in the transition between the first level and the second higher level, and by the fourth side 18 of the grate, which abuts an adjacent second grate in the second higher level.

Preferably, the first and third grate 1,3 will be made from plastic, while the second and fourth grate 2,4 preferably will be made from cast iron. However, each of the four grates may either be made from plastic, cast iron or other suitable materials. When the grates are used in a farrowing pen, the sow will be on the second and the fourth grate 2,4 in the second higher level, while the piglets preferably will be on the first and third grate 1,3 in the first level.

The angle α between the first and second set of supporting steel 27 and 32, and thereby between the first and second area, is of between 45° and 90°, preferably 76°.

FIG. 3 illustrates how the transition between the first level and the second higher level is established. The transition is provided along the entire edge area of the second higher level and thus takes place between the side edge on a first or third grate 1,3 in the first level and the side edge on a second or fourth grate 2,4 in the second higher level. The second and/or the fourth grate 2,4 are provided with a flange 20, which extends along the side edges of the grate, which are positioned in the transition between the first and the second higher level. The flange 20 extends obliquely downwards from the top side 21 of the grate 2,4 in such a way that a little overlap is generated between the grate 1,3 in the first level and the grate 2,4, in question, in the second level. It is important that this overlap does not extend too far over the grate in the first level as there is a risk of impurities being gathered in the area, where overlap exists. The vertical height h of the flange 20 corresponds to the distance between the first and the second higher level, at which the lowest edge 22 of the flange almost or exactly has contact with the top side 23 of the grate 1,3 in the first level.

The figure also illustrates how the support of the second and/or fourth grate 2,4 in one embodiment may be carried out by providing a foot 24 in a suitable number of places on the underside 25 of the grate 2,4. Just like the first and/or the third grate 1,3, the foot 24 rests on the top edge 26 of the supporting steel 27.

Figure 4:
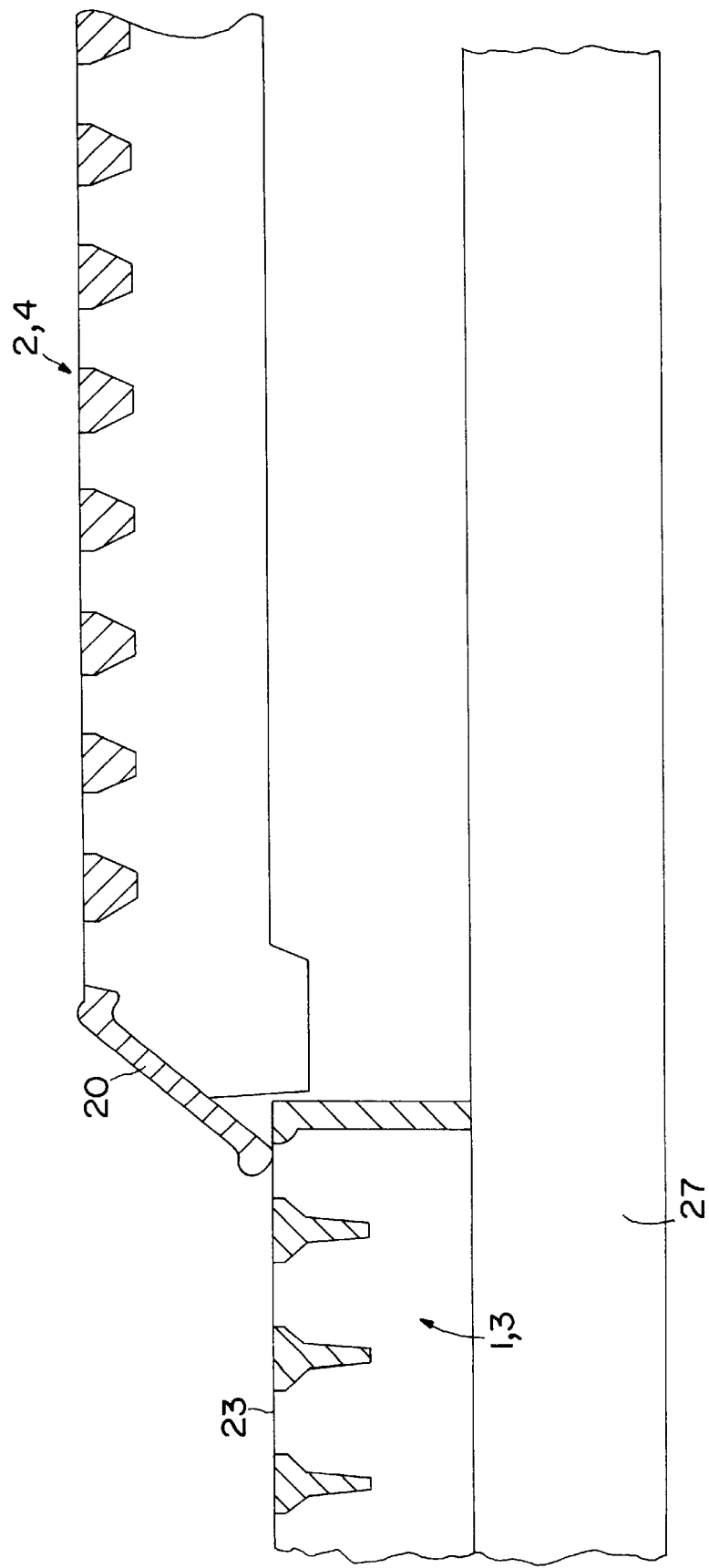
FIG. 4 shows a section through a transition between a second embodiment for a first and a second, higher level of the flooring.

FIG. 4 illustrates a second embodiment for support of the second and/or fourth grate 2,4. According to this embodiment the second and/or fourth grate 2,4 rest on the first and/or third grate 1,3 with the flange 20 on the top side 23 of the grate 1,3. Thus, it is still the first set of supporting steel 27 which supports the second and fourth grate, respectively, but via the first and/or third grate, and where the flange 20 in this case constitutes the supporting means for the second grate and fourth grate, respectively.

Figure 5:
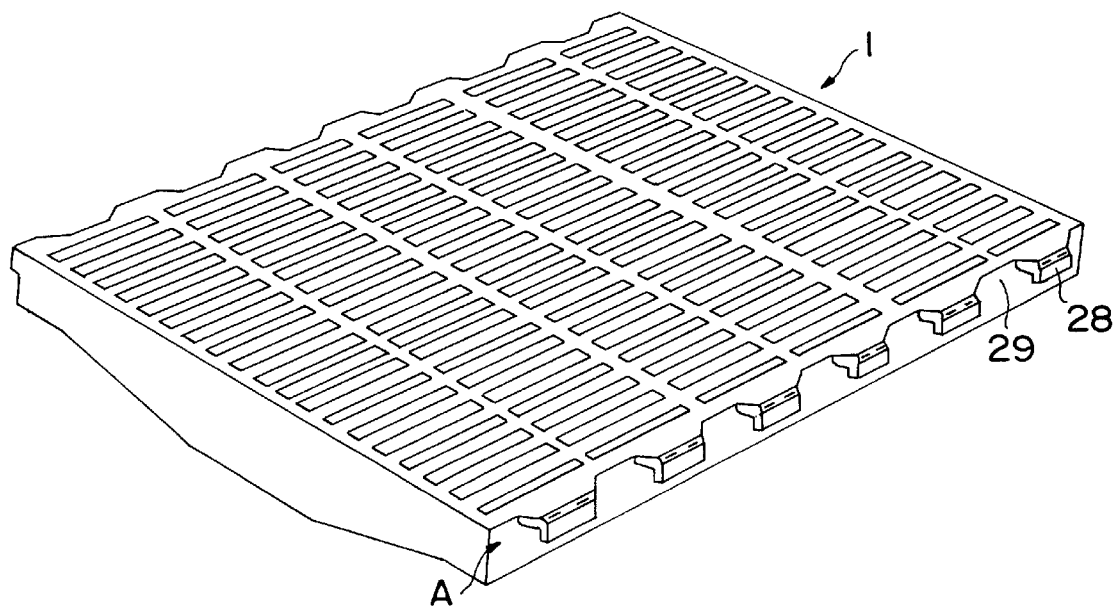
FIG. 5 shows an embodiment for connection means for interconnection of grates in the first level.

FIG. 5 illustrates a per se known embodiment for a grate 1 in the first level. The grate is provided with a toothing with teeth 28, which have a cross section as an inverted U, seen parallel to the walking surface of the grate in direction of the arrow A. The inverted U is intended for taking up the supporting steel 27 in such a way that the top edge 26 engages the bottom of the inverted U. The grates are mutually interconnected in that the teeth 28, seen in a direction perpendicular to the surface of the grate, is trapezoidal and engage the corresponding tooth spacing 29 on an adjacent grate. The interconnection is carried out by the teeth 28 on one grate being guided into the tooth spacing 29 on a second adjacent grate, at which a substantially unbroken transition is generated between the two grates, which are on the same level.

Figure 6:
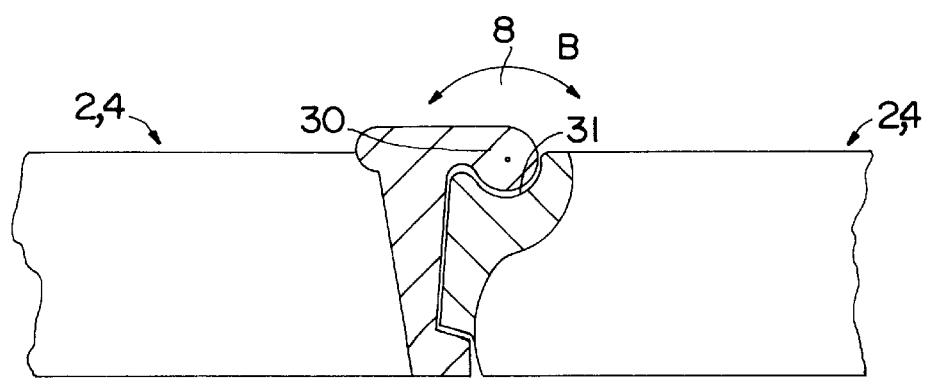
FIG. 6 shows an embodiment for connection means for interconnection of grates in the second higher level.

FIG. 6 illustrates an embodiment for connection means on grates in the second higher level. The interconnection is carried out by means of a toothing with substantially drop-shaped projections 30 and substantially drop-shaped recesses 31, respectively. The projections 30 are provided along the sides 10,18, where grates 2,4 in the second higher level abut each other, as flanges 20 (see FIG. 3) are provided along the sides 8,9,15,16, as mentioned above, which sides are provided in the transition between the first level and the second higher level. The inter connection is carried out by two adjacent grates being brought together in a position, where the top side 21 of the two grates forms an angle $\gamma$ of between 90° and 180°, after which the two grates are angled to a position, where the top side 21 of the two grates forms an angle $\gamma$ of 180°. This is illustrated in the figure by the two-way curved arrow B.

Figure 7:
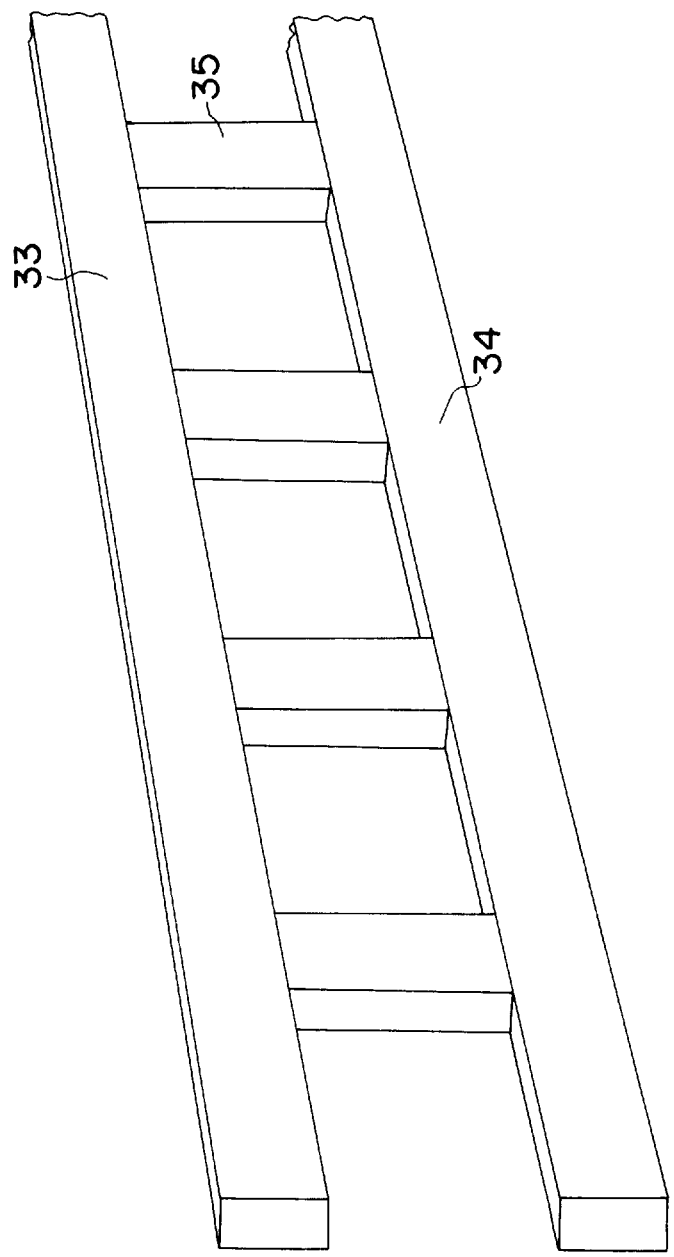
FIG. 7 shows an embodiment for a supporting steel, which constitutes a part of a second set of supporting steel.

FIG. 7 illustrates an embodiment for a supporting steel, which constitutes a part of the second set of supporting steel 32, which is used for support of the second and fourth grates 2,4 in the second higher level in the embodiment for a flooring, which is illustrated in FIG. 2. Alternatively, the second set of supporting steel can also be used in the embodiment for a flooring, which is illustrated in FIG. 1. The supporting steel consists of an upper and a lower profile 33,34, which is mutually connected with transverse profiles 35. In the embodiment shown the profiles 33,34,35 are made from flat steel with rectangular cross sections. The supporting steel, which is illustrated in the figure, is used in a position where this is directed obliquely in relation to the supporting steel which constitutes the first set of supporting steel 27, and which supports the first and second grates 1,3.

Figure 8:
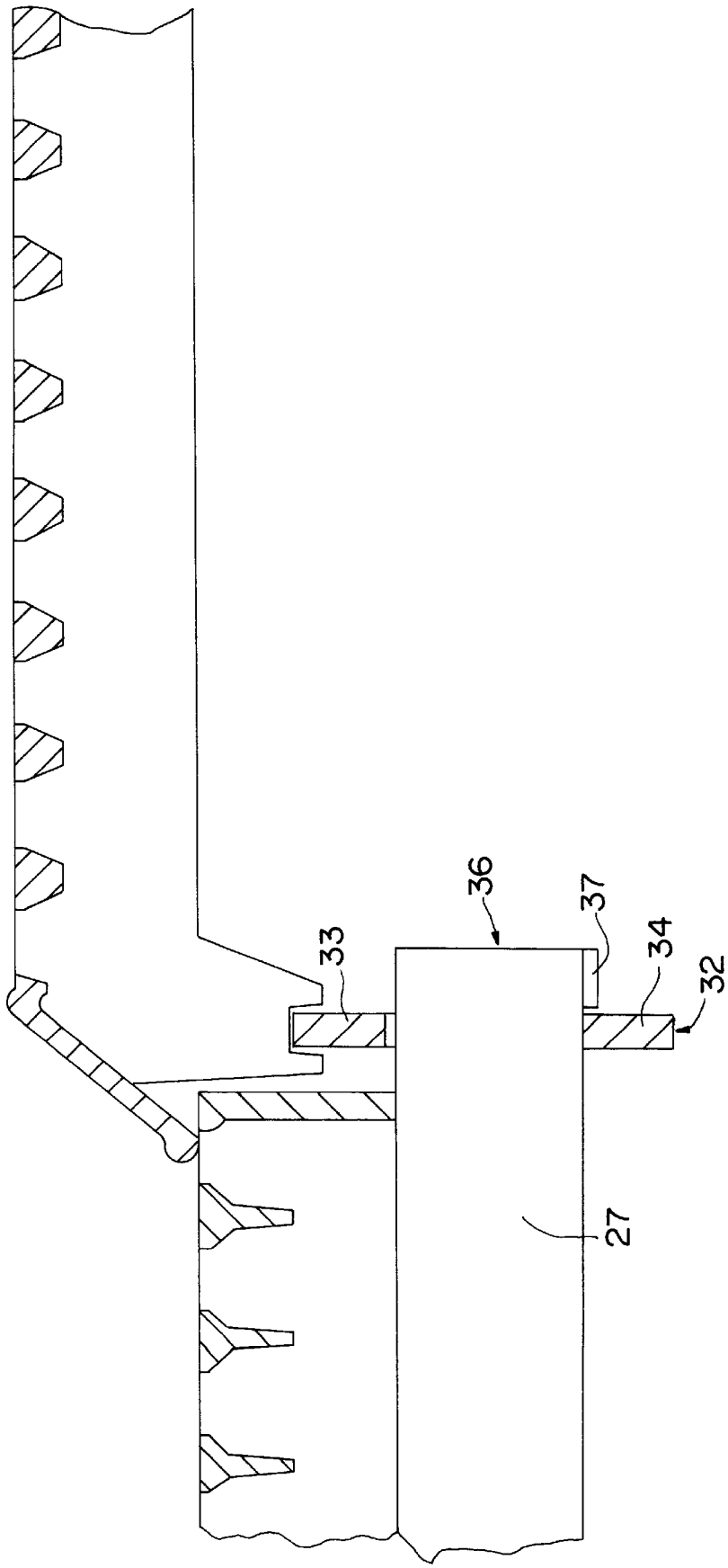
FIG. 8 shows a principle, according to which a first and second set of supporting steel may co-operate.

FIG. 8 illustrates how the first and second set of supporting steel 27 and 32 may co-operate in order to make it possible for the two sets of supporting steel to cross each other. As mentioned above, the second set of supporting steel 32 is directed obliquely in relation to the first set of supporting steel 27 at the forming of an angle $\alpha$. Each time the two sets of supporting profiles 27,32 cross each other, the first set of supporting steel extends between the upper and lower profile 33,34 in the second set of supporting steel. In the embodiment shown an outer end 36 of the first set of supporting steel 27 is illustrated, and this end 36 extends in between the upper and lower profile 33,34. The outer end 36 of the first set is provided with a stop 37 so that the first set of supporting steel 27 is not shifted out of its engagement with the second set 32.

The embodiments shown, partly for construction of a pigpen and partly for the individual specific elements and parts of these, are for the present invention for illustration purposes only. Other embodiments could be provided, which also are within the scope of protection for the present invention, just as other materials for making grates and supporting steel could also be used.

We claim:

1. Flooring in a pigpen, said flooring comprising at least one first, substantially rectangular grate (1) which is provided with supporting means for support on a first set of supporting steel along at least two of the sides of the grate, said first grate being positioned in a first area of the pigpen and with a walking surface of the grate in a first level in the pigpen, and at least one second, substantially rectangular grate (2) which is positioned in a second area of the pigpen and has a walking surface in a second, higher level in the pigpen, wherein the second grate is provided with supporting means for support on supporting steel, and the second grate has side edges which extend to the first level in the pigpen and form an unbroken connection with the first grate in the first level.

2. Flooring according to claim 1, wherein said flooring also comprises at least one third, substantially trapezoidal grate (3) which is provided with supporting means for support on the first set of supporting steel along at least one of the sides of the grate, the third grate being positioned in the first area of the pigpen and with a walking surface of the grate in the first level in the pigpen, wherein the flooring also comprises at least one fourth, substantially trapezoidal grate (4) which is provided with supporting means for support on a second set of supporting steel which is directed obliquely in relation to the first set of supporting steel, wherein the fourth grate is positioned in the second area of the pigpen and with a walking surface of the grate in the second, higher level in the pigpen, and wherein the second grate is intended for cooperating with the fourth grate and for being supported by the second set of supporting steel.

3. Flooring according to claim 2, wherein a flange is formed on side edges on the fourth grate which extends obliquely outwardly from the walking surface of the fourth grate towards an underside of the fourth grate at an angle of between 45° and 90° in relation to the plane of the walking surface and in such a way that the perpendicular distance between the walking surface of the fourth grate and the outer edge of the flange, in relation to the plane of the walking surface, corresponds to the distance between the first and second level of the walking surface in the pigpen.

4. Flooring according to claim 2, wherein the third grate includes connection means which comprise a toothing that is provided along one or several edge areas of the third grate, and teeth which are trapezoidal seen from a top side of the grate and perpendicularly on the walking surface of the third grate and which extend outwardly from an edge area on the third grate for cooperating with corresponding trapezoidal tooth spacings on an opposite facing edge area on an adjacent grate.

5. Flooring according to claim 2, wherein the fourth grate includes connection means which comprise of a toothing that is provided along one or several edge areas of the fourth grate, and projections which are substantially drop-shaped seen from a side of the grate and parallel to the edge areas along which the teeth are provided and which extend outwardly from an edge area on the fourth grate for cooperating with corresponding drop-shaped recesses on an opposite facing edge area on an adjacent grate.

6. Flooring according to claim 2, wherein the third grate is made from plastic, and the fourth grate is made from cast iron.

7. Flooring according to claim 1, wherein a flange is formed on side edges on the second grate which extends obliquely outwardly from the walking surface of the second grate towards an underside of the second grate at an angle of between 45° and 90° in relation to the plane of the walking surface and in such a way that the perpendicular distance between the walking surface of the second grate and the outer edge of the flange, in relation to the plane of the walking surface, corresponds to the distance between the first and second level of the walking surface in the pigpen.

8. Flooring according to claim 1, wherein the first grate includes connection means which comprise a toothing that is provided along one or several edge areas of the first grate, and teeth which are trapezoidal seen from a top side of the grate and perpendicularly on the walking surface of the first grate and which extend outwardly from an edge area on the first grate for cooperating with corresponding trapezoidal tooth spacings on an opposite facing edge area on an adjacent grate.

9. Flooring according to claim 1, wherein the second grate includes connection means which comprise a toothing that is provided along one or several edge areas of the second grate, and projections which are substantially drop-shaped seen from a side of the grate and parallel to the edge areas along which the teeth are provided and which extend outwardly from an edge area on the second grate for cooperating with corresponding drop-shaped recesses on an opposite facing edge area on an adjacent grate.

10. Flooring according to claim 1, wherein the first grate is made from plastic, and the second grate is made from cast iron.

11. Flooring according to claim 1, wherein the distance between the first and the second higher level of the walking surface in the pigpen is between 5 and 50 mm, preferably between 10 and 20 mm.

12. Flooring according to claim 1, wherein a second set of supporting steel is made up of a lattice construction comprising an upper and lower longitudinal, solid steel profile, preferably with rectangular cross sections, and transverse steel profiles with any cross section, extending between the upper and lower steel profiles.

13. Grate for use in a flooring according to claim 1, wherein the grate is the second grate and is provided with supporting means for support on supporting steel.

* * * * *